May 27, 1958   A. W. JOHNSON   2,836,197
ZONE-CONTROLLED HEATING SYSTEM
Filed Aug. 26, 1955
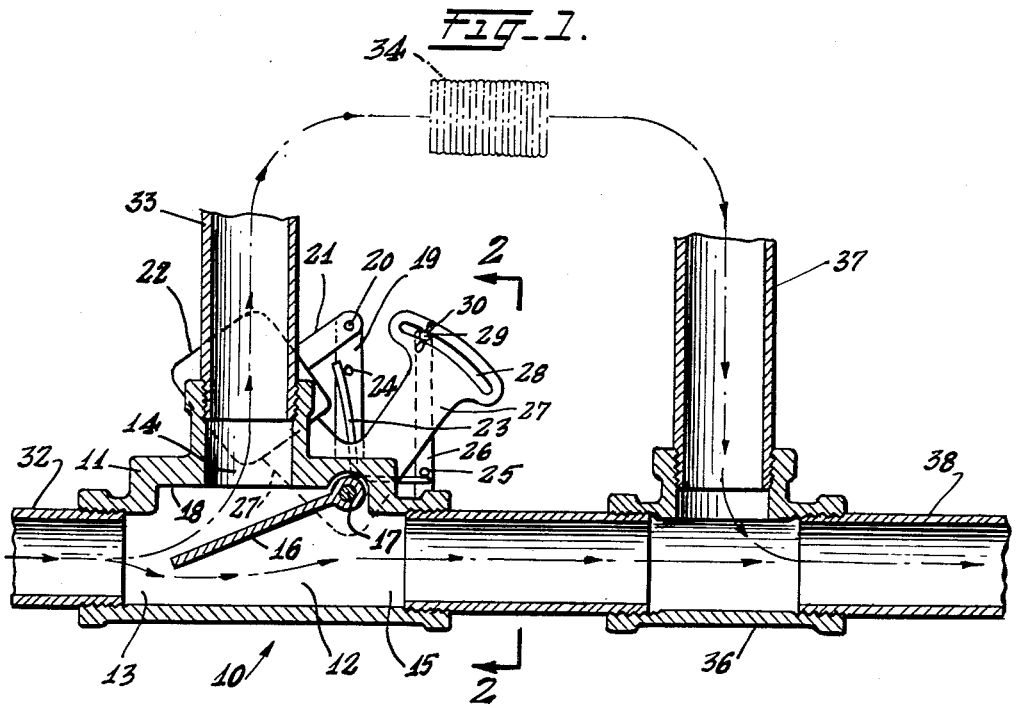
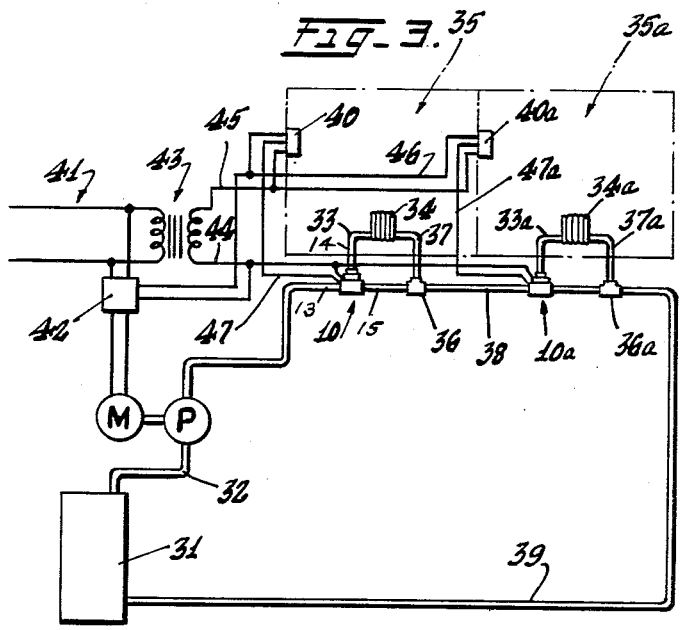
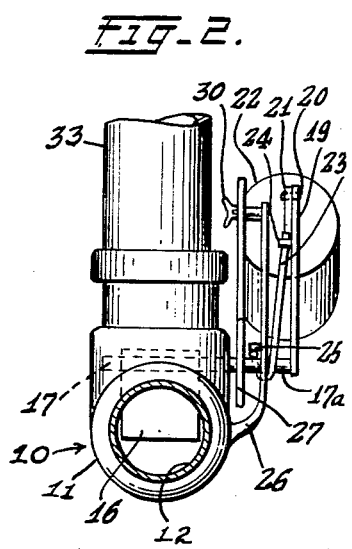
INVENTOR.
ARTHUR W. JOHNSON
BY
H. G. Manning
ATTORNEY.

2,836,197
ZONE-CONTROLLED HEATING SYSTEM

Arthur W. Johnson, Watertown, Conn.

Application August 26, 1955, Serial No. 530,677

1 Claim. (Cl. 137—625.18)

This invention relates to heating systems, and more particularly to a zone-controlled heating system having a proportioning valve for diverting heating fluid to a specific portion of the system, as desired.

One object of this invention is to provide a proportioning valve for a system employing a fluid heating medium, in which the amount of fluid diverted by said valve may be adjustably regulated.

Another object is to provide a proportioning valve for fluid heating systems which may be automatically operated by remote control.

A further object is to provide a solenoid-operated proportioning valve, in which the solenoid may be variably positioned for the purpose of regulating the operation of the valve.

A still further object is to provide a heating system for a plurality of zones to be heated, wherein proportioning valves are employed to divert fluid from a common circulating system to supply heat to said zones individually, as desired, permitting the amount of fluid diverted by each of said valves to be separately controlled.

A further object is to provide means of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing,

Fig. 1 represents a cross-sectional view in elevation, of one form of proportioning valve embodying the present invention, as it appears when installed in a hot water heating system, and illustrating diagrammatically the path of flow of the hot water.

Fig. 2 is an end view of the valve as viewed from the line 2—2 of Fig. 1.

Fig. 3 is a schematic diagram of a zone-controlled heating system employing a pair of proportioning valves, embodying the present invention.

Referring now to the drawing in which like reference numerals denote corresponding parts throughout the several views, the numeral 10 indicates one form of proportioning valve embodying the present invention, which includes a casing 11 having an interior chamber 12, provided with an inlet port 13, and two outlet ports 14, 15 respectively.

Disposed within the chamber 12 is a flat swinging valve member 16 rigidly secured to a pivoted shaft 17, one end 17a of said shaft projecting outwardly of the casing 11. The valve member 16 is so arranged that it may be swung upwardly flush against a valve seat 18, which surrounds the outlet port 14, in which position said valve member 16 will effectively close said outlet port 14 to prevent the passage of fluid therethrough.

At all other times, when the valve member 16 is swung downwardly away from the seat 18 under the control of the shaft 17, varying amounts of fluid entering the chamber 12 through the inlet 13 will be directed out of said chamber through both of the outlet ports 14, 15. It will be seen from this construction, that the largest proportionate amount of fluid will pass through the outlet 14 when the valve member 16 is in its lowermost position, and conversely the greatest proportionate amount of fluid will leave the outlet 15 when the valve member 16 is moved upwardly towards engagement with the seat 18.

The shaft 17 is provided at its outer end 17a with a control arm 19, the upper end of which is pivotally connected at 20 to an armature 21 which is adapted to move longitudinally within an electromagnetic coil 22; the arrangement being such that when the coil 22 is energized, the armature 21 will be drawn into the coil tending to move the shaft 17 and the valve member 16 in a counter-clockwise direction, as viewed in Fig. 1.

A coil spring 23 is mounted on the extension 17a of the shaft 17, with one end of said spring in engagement with a stop 24 on the arm 19, while the other end is in engagement with a stop 25 on a bracket 26 which extends upwardly at one side of the exterior of the casing 11.

Under normal conditions, when the coil 22 is de-energized, the spring 23 acting on the arm 19, will urge the valve member 16 upwardly against the seat 18 to close the outlet 14. The coil 22 is attached to one end of a bell-crank lever 27, which is rockably mounted on the shaft extension 17a, while the other end of said bell-crank lever is provided with an arcuate slot 28 through which projects a threaded stud 29 attached to the upper end of the bracket 26. A wing nut 30 on said stud serves to lock the bell crank lever 27 in adjusted position.

In operation, the proportions of hot water to be delivered to the respective outlet ports 14, 15 can be controlled within predetermined limits by an appropriate setting of the bell crank lever 27, which when rotated about its axis on the shaft 17 will change the relative position of the solenoid coil 22. As long as the coil 22 is de-energized, the spring 23, acting on the control arm 19 will maintain the valve member 16 in its upward position, effectively closing the outlet port 14. Obviously, the length of travel of the armature 21 acting on the control arm 19 in response to energization of the coil 22 will determine the extent to which the valve member 16 is rotated downwardly. Thus, it will be understood, that if the bell crank lever 27 is rotated in a clockwise direction to its extreme limit of travel, and locked in position by the wing nut 30, energization of the coil 22 will result in a minimum downward displacement of the valve member 16, so that a minimum amount of heating fluid will be diverted into the outlet 14, thus permitting the major portion of said fluid to flow past the valve member 16 and through the outlet 15. On the contrary, if the bell crank lever 27 is rotated in a counter-clockwise direction to its extreme limit of travel, the result will be that when the coil 22 is energized, the valve member 16 will be rotated downwardly to such an extent that the major portion of the heating fluid will be diverted upwardly through the outlet 14, so that only a relatively small amount of fluid will pass through the outlet 15.

While the proportioning valve just described may be used to control the amount of heat supplied to only a single radiator, it may, if desired, be employed to control a plurality of such valves in connection with a heating system which supplies heating fluid in a closed circuit to a number of rooms in a building. In such a case, the individual valves may be controlled by separate thermostats located at various points, whereby a number of separate temperature zones may be established.

Such an arrangement is diagrammatically illustrated in Fig. 3 of the drawing, wherein a conventional hot water boiler is indicated by the numeral 31 having an outlet pipe 32, leading to the inlet port 13 of the first of a pair of proportioning valves 10 and 10a. The outlet 14 of the valve 10 is connected by a pipe 33 to a radiator 34 located in the first zone to be heated, which is indicated by the numeral 35. The outlet 15 from the valve 10 leads to a T-connection 36, which is also connected by a pipe 37 to the outlet from the radiator 34, and to a pipe 38 leading to the proportioning valve 10a for the second zone 35a to be heated. The proportioning valve 10a is connected by a pipe 33a to a radiator 34a located in the second zone 35a. The outlet 15 of the valve 10a leads to a T-connection 36a, which is connected by a pipe 37a to the outlet of the radiator 34a and also to a return line 39 leading to the inlet of the boiler 31.

With this arrangement, when the proportioning valves 10 and 10a are in their closed positions, that is to say when the solenoid coils are de-energized and the valve members 16 are in their uppermost positions to close their respective outlet ports 14, there will be provided a closed circulating circuit for heating fluid from the boiler 31 through pipe 32, through the valve 10, thence to the T 36, and by means of the pipe 38 to the second proportioning valve 10a from which said fluid passes through a T 36a back to the boiler 31 through a pipe 39. It will be understood that the circulation through this system may be assisted by means of a pump P driven by an electric motor M in a manner well known in the heating art.

Automatic control of the temperature in the respective zones 35 and 35a, may be accomplished by a pair of thermostats 40 and 40a, located in the respective zones which they are intended to control. Electric power for operating the various elements of the heating system is supplied from a usual source 41, connected to a starting relay 42 for the electric motor M and to a stepdown transformer 43. A wire 44 from the stepdown transformer 43 serves as a common source of electric potential to operate the solenoids of the proportioning valves 10 and 10a and the starting relay 42. The other wire 45 from the transformer leads to contacts in each of the thermostats 40 and 40a. Another contact on each of the thermostats is connected to a common lead 46 which runs to the relay 42. A contact in the thermostat 40 is connected by a wire 47 to one of the leads of the proportioning valve 10, while a contact in the thermostat 40a leads through a wire 47a to one end of the coil on the proportioning valve 10a.

*Operation*

In operating the zone-controlled heating system shown in Fig. 3 the thermostats 40 and 40a will be arranged so that when the temperature drops in a particular zone the thermostat in that zone will cause a circuit to be established through the starting relay 42, so that the motor M will operate the pump P to circulate heating fluid in the closed circuit. The operation of the circulating pump P will be initiated whenever either one of the thermostats 40 or 40a is in a condition calling for heat to be supplied to its respective zone. If, for example, the thermostat 40 calls for heat to be supplied to the first zone 35, a circuit will be established through the wires 47, 45, and 44 to energize the solenoid coil 22 of the first proportioning valve 10. The valve member 16 will thus be rotated downwardly to divert a portion of the hot water which is being circulated by the pump P into the pipe 33 leading to the radiator 34 in the zone 35.

However, if at the same time, the temperature of the second zone 35a is such that the thermostat 40a has not closed its contact, the valve member 16 of the second proportioning valve 10a will remain closed, so that the hot water supply from the pipe 38 will be by-passed directly to the T 36a and to the return line 39 without entering the radiator 34a. On the other hand, if the contacts of the thermostat 40a are closed as a result of a drop in temperature in the second zone 35a, a connection will be established through the wires 45, 47a and 44 to actuate the coil 22 of the second valve 10a, which will then open the valve member 16 and admit heating fluid to the second radiator 34a, independently of the condition of the proportioning valve 10.

While, for the sake of example two thermostats 40 and 40a have been shown, it will be obvious that a heating system of this type can be established to provide separate heat controls for any number of zones, each of which is provided with a separate thermostat connected to a proportioning valve arranged to divert heating fluid from a closed system. Thus heating fluid will be diverted only to the radiating means located in the particular room which requires additional heat.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention, what is claimed as new, and for which it is desired to secure Letters Patent, is:

In an adjustable positioning means for an automatic electrically actuated fluid control valve for a heating system, said valve being mounted on a shaft and swingable in a chamber between a closed position to prevent flow through one outlet while permitting flow through a second outlet, and to a second open position to divert proportional amounts of fluid to both of said outlets, an electrically actuated armature rigidly secured to said shaft and operatably connected so as to swing said valve in one direction between said two positions, biasing means to urge movement of said valve and armature in the reverse direction, a coil surrounding said armature, a supporting bracket for said armature also mounted on said shaft, and means to manually swing said bracket about its axis to adjust the position of said armature with respect to said coil.

References Cited in the file of this patent
UNITED STATES PATENTS

| | | |
|---|---|---|
| 1,132,391 | Ruttle | Mar. 16, 1915 |
| 1,262,282 | Stuckwisch | Apr. 9, 1918 |
| 1,937,597 | Schmidt | Dec. 5, 1933 |
| 2,240,731 | Van Vulpen | May 6, 1941 |
| 2,246,802 | Kehm | June 24, 1941 |
| 2,255,292 | Lincoln | Sept. 9, 1941 |
| 2,350,431 | Vatter | June 6, 1944 |
| 2,357,013 | McKinnis | Aug. 29, 1944 |
| 2,559,253 | Lingen | July 3, 1951 |